US006687419B1

United States Patent
Atkin

(12) United States Patent
(10) Patent No.: US 6,687,419 B1
(45) Date of Patent: Feb. 3, 2004

(54) AUTOMATIC IMAGE MONTAGE SYSTEM

(75) Inventor: Philip Atkin, Cambridge (GB)

(73) Assignee: Synoptics Limited, Cambridge (GB)

( * ) Notice: Subject to any disclaimer, the term of this patent is extended or adjusted under 35 U.S.C. 154(b) by 0 days.

(21) Appl. No.: 09/438,461

(22) Filed: Nov. 12, 1999

(30) Foreign Application Priority Data

Dec. 8, 1998 (EP) ............................................. 98310047

(51) Int. Cl.[7] ................................................ G06K 9/36
(52) U.S. Cl. ....................... 382/284; 382/282; 382/291; 382/294; 382/298; 358/540; 358/450; 358/538
(58) Field of Search ................................ 382/278, 282, 382/284, 286, 287, 291, 293, 294, 295, 190, 209, 216, 217, 218, 219, 220, 269, 277; 345/629, 630, 625, 641; 348/584, 588; 358/450, 452, 453, 538, 540; 250/311, 582, 584

(56) References Cited

U.S. PATENT DOCUMENTS

| | | | | |
|---|---|---|---|---|
| 4,202,037 A | * | 5/1980 | Glaser et al. ................ | 345/632 |
| 4,673,988 A | * | 6/1987 | Jansson et al. .............. | 358/280 |
| 4,760,385 A | * | 7/1988 | Jansson et al. .............. | 345/641 |
| 5,038,035 A | * | 8/1991 | Nishimura et al. .......... | 250/311 |
| 5,465,163 A | * | 11/1995 | Yoshihara et al. ........... | 358/444 |
| 5,521,984 A | * | 5/1996 | Denenberg et al. .......... | 382/209 |
| 5,566,877 A | * | 10/1996 | McCormack ................ | 228/105 |
| 5,673,338 A | * | 9/1997 | Denenberg et al. .......... | 382/209 |
| 5,721,624 A | * | 2/1998 | Kumashiro et al. .......... | 358/450 |
| 5,880,778 A | * | 3/1999 | Akagi .......................... | 348/218 |
| 5,890,120 A | * | 3/1999 | Haskell et al. ............... | 704/271 |
| 6,075,905 A | * | 6/2000 | Herman et al. .............. | 382/284 |
| 6,137,498 A | * | 10/2000 | Silvers ......................... | 345/435 |
| 6,549,681 B1 | * | 4/2003 | Takiguchi ................... | 382/294 |

FOREIGN PATENT DOCUMENTS

EP 0199573 A2 10/1986

OTHER PUBLICATIONS

Hewlett Packard CapShare 910 Information Appliance, "Capturing Data: CapShare Page Processing Technology", Internet site http://www.capshare.hp.com/explore/how_it_works/capshre.html.
Pankaj Dani et al., "Automated Assembling of Images: Image Montage Preparation", 1023 Pattern Recognition, 28(1995) Mar., No. 3, Kidlington, Oxford, GB, pp. 431–445.
Lev Kaplan et al., "Acquisition and mosaicing of low–contrast background radiometric images for scene simulation", Opt. Eng., vol. 35, No. 9, Sep. 1996, pp. 2583–2591.

* cited by examiner

Primary Examiner—Bhavesh M. Mehta
Assistant Examiner—Ysef Kassa
(74) Attorney, Agent, or Firm—Rosenthal & Osha L.L.P.

(57) ABSTRACT

A system is provided for creating a larger montage image 8 of an object from a series of smaller source images 7 of different views of an object through, say, a microscope which forms an imaging means for providing images of an object. A data storage means such a framestore board 4 in a computer 5 stores data representative of the montage image of the object. Data representative of a first and subsequent source images is included in that representative of the montage image, in order to increase the data stored representative of the montage image. In order to do this, a measure of the extent of matching of the most recent source image provided by the imaging means and individual ones of a plurality of regions of the montage image which correspond in area is provided and the data representative of subsequent source images is included in the data representative of the montage image when the measure of the extent of matching is at a maximum, whereby the source image is matched to the montage image at the correct position.

10 Claims, 2 Drawing Sheets

AUTOMATIC IMAGE MONTAGE SYSTEM

BACKGROUND OF THE INVENTION

The present invention relates to the automatic creation of a larger image of an object or scene from a series of smaller source views. Such an image is known as a 'montage' and, particularly when using a microscope and camera combination, enables a higher resolution image to be formed of a much larger region of the object or scene than is possible otherwise.

When recording a scene by means of a camera, three particular limitations may pose problems: firstly, there may be a limited field of view (ie. in the x and y coordinate directions); secondly, there may be a limited depth of field (in the z coordinate direction, ie. that of the camera axis); and, thirdly, there may be limited camera resolution. In particular, these can be severe in the case of an image being recorded (eg photographed) through a microscope.

Prior art solutions to one or more of these problems are as follows:

Accurately reposition the camera or the subject and record multiple images, then 'stitch together' afterwards. An example of a system using this technique is the MIA package from Soft Imaging System GmbH (SiS) which generally requires direct control of a microscope stage in order to position the object under the objective lens in a series of positions such that overlapping images can be 'stitched' together to form a larger image. Disadvantages are that the positions need to be known accurately.

Our Auto-Montage technique in which multiple digitally recorded images are taken at different focus settings of the camera or z-positions of the subject, and then formed into a single image where each pixel is selected from the source image which shows the most contrast (equivalently, is most in focus).

High resolution and hence more expensive cameras. For electronic cameras, cost becomes prohibitive beyond about 2 k pixels square.

Although the present invention is aimed primarily at dealing with the first and third of the three problems outlined above, it may also, in suitable embodiments, deal with second problem.

SUMMARY OF THE INVENTION

According to the present invention there is provided a system, for creating a larger montage image of an object from a series of smaller source images of different views of an object, which includes imaging means for providing, continually in use, images of an object;

data storage means for storing data representative of the montage image of the object;

means for including the data representative of a first and subsequent source images in that representative of the montage image, in order to increase the data stored representative of the montage image; and means for providing a measure of the extent of matching of the most recent source image provided by the imaging means and individual ones of a plurality of regions of the montage image which correspond in area;

the arrangement being such that data representative of subsequent source images is included in the data representative of the montage image when the measure of the extent of matching is at a maximum, whereby the source image is matched to the montage image at the correct position.

The present invention also includes a method of creating a larger montage image of an object from a series of smaller source images of different views of an object, which method includes generating a series of source images of an object;

allocating memory within a data storage means for storing data representative of the montage image of the object;

storing data representative of a first and subsequent source images in the memory, in order to store data representative of the montage image; and measuring the extent of matching of a most recent source image and individual ones of a plurality of regions of the montage image which correspond in area;

data representative of the subsequent source images being included in the data representative of the montage image, when the measure of the extent of matching is at a maximum, so that the source image is matched to the montage image at the correct position.

Preferably, a threshold value of the measure of the extent of matching is preselected so that source images which will not match with the montage image are discarded.

The montage image is thus built up gradually from the subsequent source image data being added to the first source image data which represents a first data set for the montage image. The source image data can be provided by a camera or other image capture device moved relative to the object.

By comparing the most recent source image with regions of the montage image in turn, the source image can be 'located' relative to the montage image and the additional data representative of the source image incorporated into the data set defining the montage image so as to expand the montage image. This process can be repeated until the montage image is complete. The comparison may be carried out in a number of different ways, some of which are detailed later, and may be carried out on a subset of the image data of both the montage image and the source images.

The size of the completed montage image may be predetermined, but may be allowed to increase by allocating more memory to the montage image.

Thus, new data is stored representative of a new image at a position at which the new source image closely matches a region of the montage image. If this position has not changed since the previous measurement, the source is stationary and thus there is determined an appropriate position at which to insert the source image into the montage image.

It is preferred to add source image data to the montage image data when the source image data is provided from a stationary image. This provides two benefits:

Any motion blur or interlace distortion of the source images is minimised, so the image pasted into the montage should be free of these artefacts;

If the system waits for the movement to stop before doing the more time-consuming elements of the process (fine position determination, 3D Auto-Montage), movement can be tracked rapidly and the time-consuming elements of the processing can be done when the delay is less significant to the operator.

Advantageously, the system indicates when it has determined the subject to be stationary (and is therefore updating the montage image), and when it is moving. The system may also indicate when it cannot determine the position confidently, either because of poor matching or low overlap. Furthermore, the system may indicate when it requires the user to pause for some reason (such as to save some data).

The system is particularly suitable for use with a microscope and camera combination for capturing highly magnified images of small objects. Preferably, the system includes a computer and software adapted to carry out the steps outlined above, the montage image and the current source image (or a rectangle representing its location relative to the montage image) being displayed on a monitor to provide feedback to a user operating the system (in the case of a microscope, the operator moving the microscope stage in order to re-position the object relative to the camera).

Because of the nature of the acquisition process, it is important that this feedback be given simply and directly. Colours, flashing and audio signals may all be employed so that the user has a 'quiet cockpit' when the system is operating normally, and can concentrate on exploring the subject.

The determination of the appropriate position at which a newly captured image should be incorporated into the montage image may be achieved by a variety of means, including the location and matching of specific or significant features in the image, or by finding the location of the source image at which the difference between the source and the montage images is at a minimum.

Preferably, a similarity measure is used, so that the source is, notionally, shifted across the montage image until a maximum is found in the similarity measure. This may conveniently be achieved by means of a type of cross-correlation statistic called 'covariance'. Cross-correlation and covariance are known to be robust similarity measures in the presence of noise, an important characteristic when dealing with images from a microscope.

For example therefore, if s is an intensity from the source image and m is the corresponding intensity from the corresponding position of the montage image, then the covariance c can be calculated at the selected relative position by the equation:

$$c = \frac{\sum_{s \cap m} s*m}{n} - \frac{\sum_{s \cap m} s}{n} * \frac{\sum_{s \cap m} m}{n}$$

where S∩M is the intersection of the valid regions of the (displaced) source and montage images, and n is the number of pixels in that intersection. The initial source image is generally considered to be 'valid' throughout, whereas the montage image is only valid where it has already been set. (In the current implementation, the montage image starts out with the value of zero, ie it is notionally 'empty', and only non-zero pixels are considered valid). It makes sense, however, to allocate a 'rectangular' array of memory of some chosen size (say 2000×2000 pixels) from the outset. When a source image is 'pasted' or 'written' into the montage image (for which the term 'set' can be used), that part of the montage is then regarded as 'valid' or 'set to something' rather than being 'empty'. The particular representation of this which has been chosen for one example is to fill the montage initially with zero, then to treat non-zero pixels as 'valid' or 'set'.

It is useful to consider the validity of each pixel, because otherwise the process tends to 'lock on' to the edge of the valid montage regions (this edge is effectively the most significant feature in the source data).

If the covariance similarity score is plotted against the offset vector V, a single peak in this surface should be seen corresponding to the true offset between the source image and the montage, V1. If, however, non-valid pixels are not discarded from the calculation, a second peak (quite likely even higher) at another offset, V2 may result. Thus, referring to FIG. 2, if the source image lines up with some edges of the montage image, then these 'edges' give rise to a very high similarity score despite the fact that the image detail does not match up. In other words, the edges are much more significant 'features' than the details of the image. This can easily result in the algorithm choosing the incorrect (V2) peak in the covariance function, and pasting the source image into the wrong position.

Even with a source image of standard TV resolution (768×576 in Europe), if one tries to calculate this statistic over the whole of the montage image of (let's say) 2000× 2000 pixels, in the order of $10^{13}$ calculations may be required. To make the system practical with current personal computers, it is therefore advisable to 'prune' the search space as far as possible. First, the search space can be reduced by using previous knowledge of the position of the source image within the montage image, and (potentially) its speed of movement across it. If we are able to reduce the uncertainty in position to (say) 64 pixels either way from the previous (or predicted) position, then this reduces the search process to around $10^{10}$ calculations.

Further, we can adopt a coarse-fine technique. Assuming that the noise level is 'not too bad', we can achieve a coarse estimate of the position by both sub-sampling the image in both directions (only processing every $16^{th}$ pixel in each direction, say), and by shifting the source image over the montage image in larger steps (say 4 pixels). In this manner, we can obtain a coarse estimate with perhaps around $10^6$ calculations, which will take around 5 ms on a modern PC. We can then improve the measurement by reducing the sub-sampling and the size of the shift step, but now we need to search over a much smaller area. Thus the total position measurement time can be kept short relative to the camera acquisition time and the speed of the operator. (It may be noted that as the speed of the algorithm improves, the uncertainty in the position diminishes, and the search space can be reduced further.)

An important refinement is that if the coarse measurement indicates that the subject is moving, there is no need for the fine measurement. This means that the system can have the highest update rate when it is most necessary; when the subject stops the more lengthy matching procedure is not objectionable.

The system needs to be 'confident' of the matching location because in general mistakes cannot be undone once data has been incorporated into the montage image data stored. Two confidence limits may therefore be imposed by the present system:

The covariance measured must lie within some tolerance of the previous accepted covariance measurement;

The number of valid pixels considered in the calculation of the highest covariance score must exceed a threshold. This is effectively the area of overlap of the source with the existing montage pixels, so it can be expressed simply as (for example) "half of the source image must overlap with the valid regions of the montage image".

The following describes how the system of the invention may be adapted to work in '3D' mode, which adds consideration of the z (camera axis) direction. These aspects extend the effective depth of field of the optical system.

In this case the motion tracking process works exactly as in the '2D' mode, and the consideration of the third dimension occurs only when the subject is stationary and therefore we have a 'new' source image and a position within the montage image where it belongs. At this point the action is somewhat different: each pixel within the source image is considered, and it is written to the montage image only if the contrast in the source image at that point is greater than the best contrast previously recorded for the corresponding point in the montage image. Here 'contrast' is deliberately vague: what we want to measure is how well 'in focus' that part of the image is. Various measures may be used, including local edge information or the variance of the pixels surrounding; all these may be shown to relate to contrast. Implicit in this description is the fact that a separate 'best contrast' value for each point in the montage image needs to be maintained; this adds considerably to the memory requirements.

The '3D' update process can be described as follows:

For each pixel in the source image
{
   If the 'source contrast' here is greater than the 'best contrast' at the corresponding position in the montage
   {
      Copy the source pixel to the corresponding pixel in the montage image
      Copy the 'source contrast' value to the corresponding 'best contrast'
   }
}

Note that the 'best contrast' is initialised to zero throughout, so that the first source image to arrive at a particular position is always inserted in toto.

The descriptions above have described the case of a monochrome camera. For colour images, the covariance and contrast can be calculated from a single pre-selected colour plane, a colour plane selected to give the maximum overall contrast, or the sum of the colour planes (which effectively computes the equivalent monochrome image).

The system as described uses a montage image of fixed size. However, it is important to react appropriately as the position of the source image approaches an edge of the montage image. Several actions are possible:

The calculations are 'clipped' as appropriate, and areas of the source image that extend beyond the edge of the montage image are ignored. This means that the montage image can be 'filled' right up to its edge.

If the montage image is only partially used (say, we placed the first source image in the centre and subsequently we have only moved up and right), then the contents of the montage image can be shifted within the existing memory, so that this memory can be used more effectively. To achieve this efficiently, it is probably necessary to calculate and maintain the extremes of the valid montage pixels in x and y.

A new montage image (and in the '3D' mode, corresponding 'best contrast' values) can be allocated to further extend the field of view. The existing data can be copied into the new. The user may need to be instructed to pause while this happens.

The montage image might be 'tiled', with only those tiles currently required remaining in working store (RAM) and the unused tiles being saved on disk. In this way, extremely large images might be acquired. This mechanism is more complex, but has the potential to avoid any significant delays for the user since the disk data may be written in small amounts as a background task.

Manual override of the automatic operation may sometimes be desirable. Three cases have been identified:

A really good image of an extended field of view has been captured, but the user wishes to add to the extent of the montage in a region remote from the present position. In this case, the user should be able to specify that the system should continue to track the motion of the source image across the montage image, but should not update the montage image. When the region is reached where it is desired to capture more images, the user removes this injunction.

Incorrect or poor images have been recorded in some region of the montage. In this case the user may wish to 'undo' recent updates to the montage image (although this will require considerable memory), or more likely to simply 'rub out' these regions. Subsequently, the facility described above will allow the position to be re-synchronised with the montage image, before new updates are permitted.

An incorrect, or poor, image has been recorded in '3D' mode and consequently the 'contrast' information associated with this region of the montage image is also incorrect—which in turn will mean that subsequent updates in this region will not take place correctly. In this case the user may wish to 'refresh' both the montage image for the region and the corresponding 'best contrast' record.

Whilst it is a significant benefit of the 'basic' invention that it requires no special modifications to the microscope, there are potential benefits from adding control of the 'z' position of the sample, particularly in '3D' mode. These are:

Knowledge of the z position of the sample means that the (relative) depth of each point can be measured, by detecting the z position that resulted in the maximum contrast. This requires the retention of this information for each point (more RAM), but means that the result of the process is a data set that provides the z position of each point of the subject. This enables 3D measurements of the surface to be made, and visualisations using computer graphic techniques or stereo pairs (Auto-Montage provides such facilities).

The scan in depth (z) can be made reliably and repeatably, and more quickly than by hand. Potentially, the system could automatically perform a z scan every time it detected that the subject was stationary.

Motion tracking will be most reliable when the subject is generally in focus. The system could measure the overall contrast for each z step (the total variance of the intensity values is suitable), and automatically return the stage to the z position which gave maximum contrast after each scan.

Again, while it is a significant benefit of the invention that no motorised stage is required, there may be applications where it is appropriate to use one.

Control of the microscope stage and the image acquisition through a single computer interface may be advantageous.

The present invention may be used to perform a rapid scan of the object, to determine its extent in x, y (and z) and to build up a preliminary view. In this case, it will be appropriate to place the stage under the control of the system, so that its movements can be related to the motion of the image (in other words, the system as a whole can be calibrated). Using both the extent and calibration information, the system might perform a much more sophisticated image montaging scan (in x, y, and z) which would take much longer but which would be fully automatic.

Where the source image contains (or is likely to contain) many repeated elements, such as the features on an integrated circuit, the covariance calculation may show many maxima of similar value, and no clear global maximum will be discernable. In these cases, the use of direct stage control will enable a particular local maximum to be identified as corresponding to the 'true' position.

There may sometimes be a systematic distortion of the brightness and/or colour values in each source image. Possible causes are camera defects (variations in black level or gain across the camera, uneven illumination or variations in the transparency of the optics). Such defects can generally be modelled, measured, and subsequently corrected. Where such artifacts are significant, they will often produce a noticeable edge in the montage image where (say) the left-hand region of one field of view overlays the right-hand region of another. In this case, it is appropriate to correct each field before inserting it into the montage image. As mentioned above, this may be more useful in an automatic scan, where time is not so critical.

Microscope optics frequently collect dust and debris which is difficult to remove. These may result in high-contrast detail in the source images, which will not only appear in the final result but may also distort both the similarity calculations and the contrast calculations. A separate procedure may be used to identify the defects, which are stationary in each frame and independent of the sample. Two refinements to the basic technique are then possible:

The regions of the source image corresponding to the defects can be considered 'invalid' as far as the similarity measurements are concerned. This prevents them from dominating the measurements as they might otherwise do.

The regions of the source image corresponding to the defects can be masked out when the montage image is updated with the contents of the source image. Since the subject can be moved slightly and the montage updated again, the 'missing' regions can be filled in.

It may be desirable to adapt certain algorithms to the characteristics of the source images. For example, the shape of the peak in covariance will be very broad if the image is defocussed, or very narrow if there is a great deal of sharp detail. In such cases it may be necessary to adapt the search technique to suit. In the case of a sharp peak, it may be necessary to consider more possible positions of the source image relative to the montage image, since otherwise the true peak may be fall between the steps in position.

Similarly, by measuring the statistics of the source images, it is easy to derive the expected value of the covariance function. This might be used to determine the confidence threshold, rather than simply working from the most recent accepted maximum covariance value.

If the expected shape of the 'covariance vs. relative position' function is known (and it can easily be estimated by computing this function using the source image and a displaced version of itself), then from a few points near the peak one can interpolate the exact position of the peak. In the case of a coarse search, this may enable the estimation of the peak location to be achieved more accurately than the basic step size would imply. In the case of a fine search, it can be used to determine the matching position of the source within the montage image to a precision better than one pixel; the source image can be re-sampled to reflect this more accurate position before it is inserted into the montage image.

Some cameras have a poor optical performance which results in an effective resolution well below the pixel resolution. In such cases, it may be possible to obtain better results by reducing the pixel resolution of the source image before it is placed in the montage image. The magnification of the microscope can be altered to compensate, and the invention allows the pixel resolution of the final montage image to be far higher than the original resolution of the source.

BRIEF DESCRIPTION OF THE DRAWINGS

One example of a system constructed in accordance with the present invention will now be described with reference to the accompanying drawings, in which.

DETAILED DESCRIPTION OF THE PREFERRED EMBODIMENT

Figure 1:
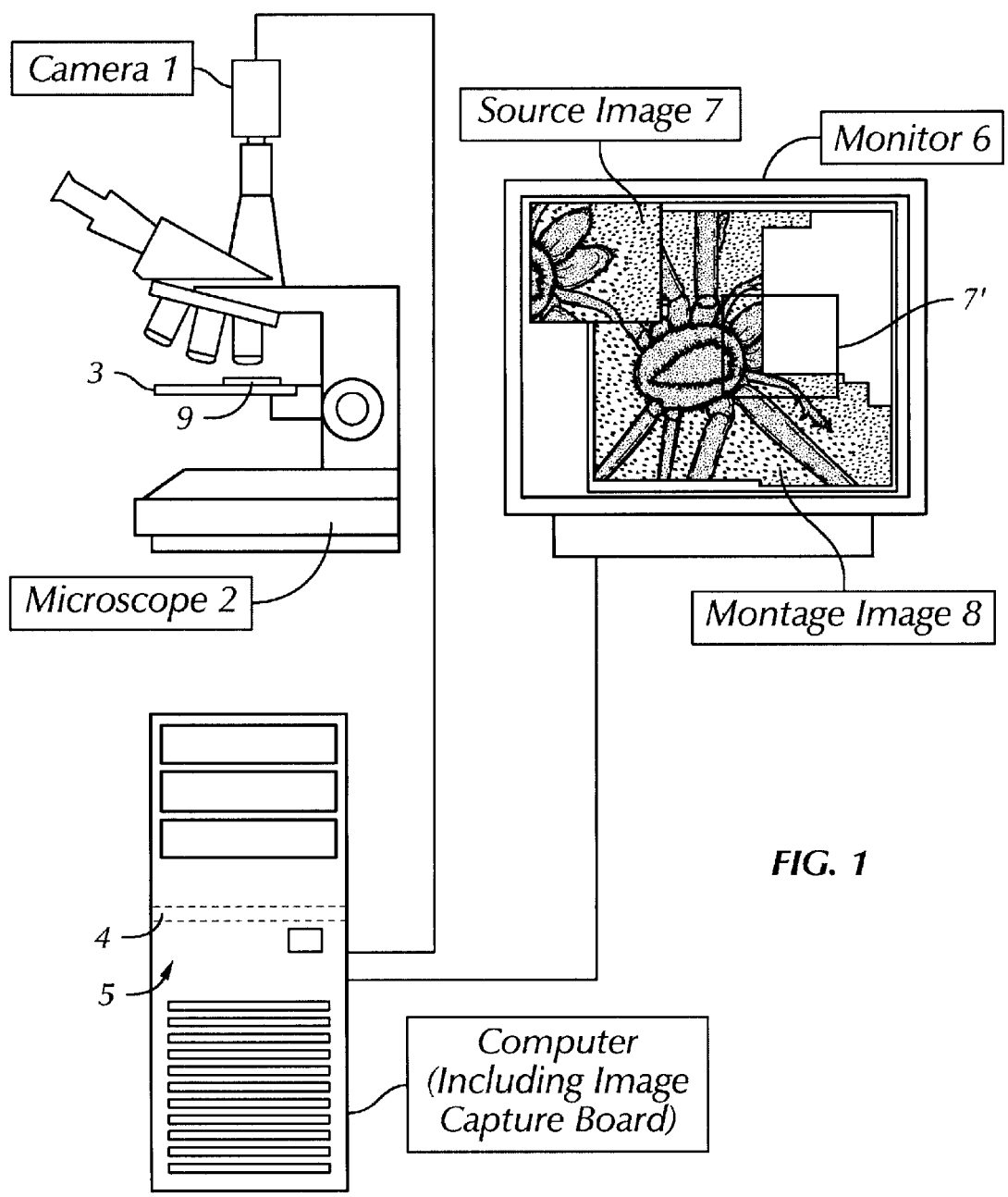
FIG. 1 is a general view of the apparatus.

The system as implemented in the example consists of a camera 1 (in the particular example, a JVC KY-F50E camera) mounted on a microscope 2,(in the particular example, a Nikon Labophot microscope) and having a stage 3 which can move the specimen (or object) 9 in x and y (ie the plane of the stage), but which does not rotate. The camera output signals are digitised by a framestore board 4 (a Synoptics Prysm framestore) within a personal computer 5 (a Gateway 2000 PC with 233 MHz Pentium II processor and 96 MB RAM running Windows 98) and then the digital image is placed in the computer's memory. Control of the system was achieved using software written in Visual Basic and C++ using Synoptics Image Objects to handle the display and processing functions.

Figure 2:
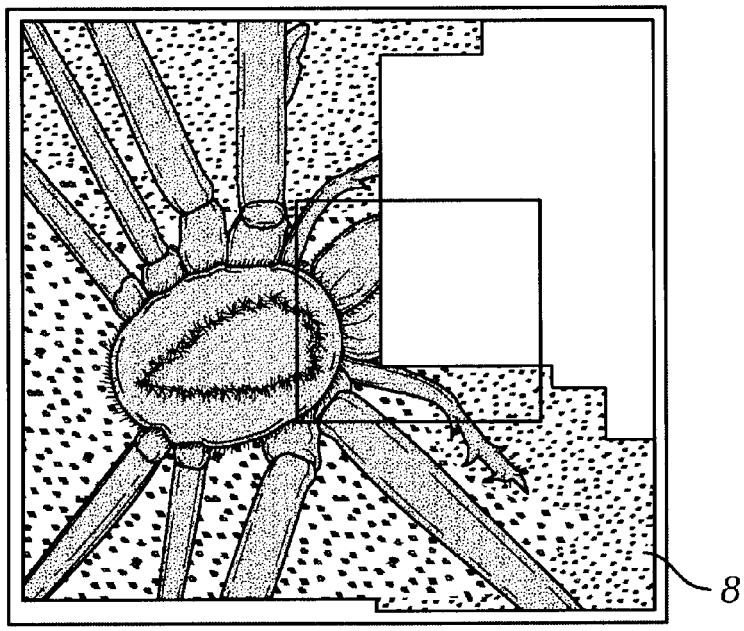
FIG. 2 is a representation of a montage image on the monitor at a given time during operating of the system.

As indicated in FIG. 2, the computer screen or monitor 6 generally shows the 'montage' image 8 on which is indicated both the detail of a new source image 7 direct from the camera 1 and (by the rectangle 7') the area of the montage image it will occupy. The images are shown in more detail in FIGS. 2 to 4.

Overall, the operation is to copy the source image 7 into the montage image 8:

When the sample is stationary, and

At a position which lines up with the current contents of the montage image.

The technique involved is as described above, using the covariance measure of similarity, although other measures of similarity may be used or measures of difference.

The montage image is initially allocated in memory as (say) a 2000×2000 array of pixels. Memory for all the pixels is allocated and initialised to zero. After some time the montage image has been built up to what can be seen in FIG. 2, so that this represents the 'current' montage image. Note that some portions of it are still black (ie zero), because they have not yet been filled in or set to anything. The valid parts are simply the regions which are not black and which have been filled from captured images.

Figure 3:
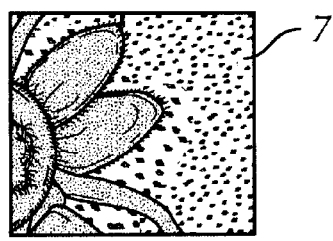
FIG. 3 is a representation of a new source image.

Now if FIG. 3 represents the new (say 768×576 pixel) source image which has been captured, it is necessary now to locate the rectangle of the new source image within the montage image. This is done by finding the position where there is the best match between a (768×576 pixel) region of the montage and the new source image. This is done by notionally (ie within the computer) shifting the new source image across the montage image, continually computing the covariance of corresponding pixels and looking for the position of the source which maximises the covariance.

The following pseudo-code routine may be used:

```
count = 0
sumS = 0
sumM = 0
sumSM = 0
for y=0 to 575
{
  for x=0 to 767
  {
    if m(x+px, y+py)>0
    {
      count = count+1
      sumS = sumS + s(x,y)
      sumM = sumM + m(x+px, y+py)
      sumSM = sumSM +s(x,y)*m(x+px, y+py)
    }
  }
}
covariance = sumSM/count - sumS/count * sumM/count
if covariance>bestCovariance
{
  bestCovariance = covariance
  bestPx = px
  bestPy = py
}
```

It may be easier to consider an alternative method in which a 'difference' measure is considered instead of covariance. In such a case the position (px,py) is searched for which minimises the sum of differences between the source and the montage.

The following routine may be followed:

```
count = 0
diff = 0
For y=0 to 575
{
  For x=0 to 767
  {
    if m(x+px, y+py)>0
    {
      diff = diff + abs(s(x,y) - m(x+px, y+py))
      count = count+1
    }
  }
}
averageDiff = diff/count
if averageDiff<bestAverageDiff
{
  bestAverageDiff = averageDiff
  bestPx = px
  bestPy = py
}
```

... where s(x,y) is the intensity of the source at (x,y), and m(x+px,y+py) is the intensity of the corresponding pixel of the montage when the source is shifted by (px,py).

When the position giving the best match is located, the picels are copies into the montage by a routine as follows:

```
for y=0 to 575
{
  for x=0 to 767
  {
```

-continued

```
    m(x+px, y+py) = s(x, y)
  }
}
```

Figure 4:
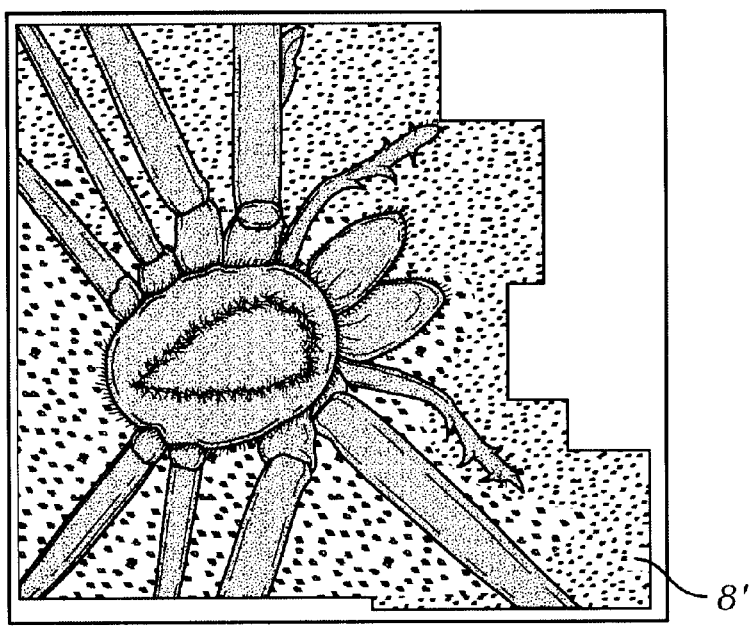
FIG. 4 is a representation of the montage image after the source image data has been incorporated into the montage image data.

Thus the contents of the memory are changed to include the source image 7 as illustrated in FIG. 4, providing an updated montage image 8'.

If the position of best match—(px, py)—is measured and a new image is then captured and the measurement made again (px', py') and if these two are very similar, then it can be concluded that the object or scene and camera are stationary relative to one another. This is not an essential step, but it provides the two benefits referred to above. The stationary situation is thus detected through successive measurements of the source image position within the montage image, not by comparing successive source images (though this would be possible).

An advantage over the prior art SiS type of system referred to above is that it does not require the expense of a motorised stage. Additional advantages (which also hold in the case where a motorised stage is available), are that the result can be seen immediately, as the subject is explored, and that the extent and shape of the subject do not need to be known (or guessed at) in advance.

What is claimed is:

1. A system, for creating a larger montage image of an object from a series of smaller source images of different views of an object, said system including
    imaging means for providing, continually in use, images of an object;
    data storage means for storing data representative of the montage image of the object;
    processing means for
        (a) including the data representative of a first and subsequent source images in the said data representative of the montage image, in order to increase the data stored representative of the montage image;
        (b) providing a measure of the extent of matching of the most recent source image provided by said imaging means and individual ones of a plurality of regions of said montage image which correspond in the area; and
        (c) including said data representative of subsequent source images continuously in said data representative of the montage image when the measure of the extent of the matching is at a maximum,
    whereby the source image is matched to the montage image at the correct position.

2. A system according to claim 1, wherein the source image data is provided by an image capture device moved relative to the object.

3. A system according to claim 1, wherein the data storage means, the means for including data in the montage image data, and the means for providing a measure of the extent of matching comprise a computer programmed accordingly.

4. A computer program medium having a computer program for use in a system according to claim 1, the computer program having
    means to provide a measure of the extent of matching of the most recent source image provided by the imaging means and individual ones of a plurality of regions of the montage image which correspond in the area; and
    means to cause the data representative of a subsequent source image to be included in the data representative of the montage image when the measure of the extent of matching is at a maximum.

5. A method of creating a larger montage image of an object from a series of smaller source images of different views of an object, which method includes generating a series of source images of an object;

allocating memory within a data storage means for storing data representative of the montage image of the object;

storing data representative of a first and subsequent source images in the memory, in order to store data representative of the montage image;

measuring the extent of matching of a most recent source image and individual ones of a plurality of regions of the montage image which correspond in the area; and including data representative of the subsequent source images continuously in the data representative of the montage image, when the measure of the extent of matching is at a maximum, whereby the source image is matched to the montage image at the correct position.

6. A method according to claim 5, wherein a threshold value of the measure of the extent of matching is preselected and source images which will not match with the montage image are discarded if the respective measure is less than the threshold value.

7. A method according to claim 5, wherein the size of the completed montage image is predetermined, but is allowed to increase by allocating more memory to the montage image.

8. A method according to claim 5, wherein, in order that the new data that is matched is the most representative of the respective image of the object, a determination is first made of whether or not the image means is stationary relative to the object.

9. A method according to claim 5, wherein the measurement of the degree of matching includes measuring a parameter determinative of the degree of similarity or a parameter determinative of the d,degree of difference.

10. A method according to claim 5, wherein the measurement of the degree of matching is first carried out on a subset of the captured data and secondly, if required, on the full set of data captured.

* * * * *